United States Patent Office 3,032,195
Patented May 1, 1962

3,032,195
ORE BENEFICIATION PROCESS
Douglas H. Fenske, Lakeland, Fla., assignor to International Minerals & Chemical Corporation, a corporation of New York
No Drawing. Filed Dec. 9, 1957, Ser. No. 701,298
10 Claims. (Cl. 209—166)

The present invention relates to the beneficiation or concentration of ores. More particularly, the present invention relates to a process of beneficiating or concentrating phosphatic ores, or phosphorus-containing materials. In general, the process of the present invention is applicable to beneficiation of any non-metallic ore such as, for example, apatite, fluorapatite, sylvite, langbeinite, fluorspar, feldspar, and the like.

Apatite and fluorapatite, which are crude phosphatic materials or minerals, occur widely in nature and are generally thought to be chiefly tricalcium phosphate coupled with other minerals such as quartz, silicates, calcium carbonate, and the like, all of which, of course, contain no phosphorus and are of little, if any, nutritive value so far as plants and animals are directly concerned. Such materials, in addition, contain traces or minor quantities of heavy metals, heavy metal salt oxides, such as ferric oxide, aluminum, and the like.

Many methods have been devised in the past for treating such ores to effect beneficiation or concentration of the phosphatic constituents by removing the siliceous, carbonaceous, and heavy metal constituents therefrom. Several methods involve the desliming, dewatering and separation of either pulped or unpulped material in order to effect this beneficiation and concentration. One commonly used method involves the reagentizing and flotation of dewatered ore with a collecting agent used in conjunction with a relatively high boiling hydrocarbon oil or liquid, together with the use of a basic component such as caustic. When an aqueous suspension or pulped phosphatic rock is reagentized with a composition containing this combination and the same agitated and aerated in an aqueous suspension, the phosphatic values and components of the rock are found to rise and become segregated in the upper portion of such suspension while the siliceous values are found to settle or deposit in the lower portion of such a suspension. The beneficiated or enriched phosphatic material is withdrawn and may be further treated by re-flotation for further beneficiating the phosphatic ore, and the material so segregated is either subjected to acid treatment for the production of superphosphate, or is ground and sold as raw, enriched phosphate rock having from 60 to 75%, and even as high as 80%, of tricalcium phosphate computed as bone phosphate of lime (B.P.L.).

Various methods of operating beneficiating and concentrating processes of the flotation type to improve the recovery and the grade of the phosphate in the beneficiation product have been attempted in the past. Some of the factors which control the recovery and grade of phosphate in the beneficiation product are the properties of the ore, the pH of the slurry, the type and quantity of reagents and the type and quantity of "aeration." Because of the large scale character of the business of producing phosphate rock concentrates, and the highly competitive market existing in such a business, it is important that the reagentizing composition used be relatively inexpensive. Great effort has been expended to discover collecting agents which will be more efficacious, yet which may cost even less than those heretofore employed. It is, however, not alone desirable to employ a collector which may be used in smaller quantities to effect an efficient segregation of the phosphatic values, but it is also important that the values recovered be of a relatively high purity and relatively free of solids other than the desired phosphatic material.

It is an object of the present invention to provide a new reagent for use in an ore beneficiation process.

It is another object of the present invention to provide an improved process of beneficiating and concentrating ores.

It is a further object of this invention to provide an improved process of beneficiating and concentrating phosphatic ores.

It is a further object of this invention to provide an improved process of beneficiating or concentrating phosphatic ores by a froth flotation method.

It is a further object of this invention to treat a phosphatic ore with a new flotation agent so as to improve the efficiency of selectively reagentizing and floating the phosphatic components to the exclusion of the gangue.

It is a still further object of this invention to subject phosphatic ores to froth flotation and to collect a concentrate having a high percentage of tricalcium phosphate.

The reagentizing of phosphatic ores or phosphorus-bearing materials for the purpose of beneficiating and concentrating these phosphatic values has been practiced for many years. The present invention is directed to the discovery of and use of an improved reagentizing composition for this purpose.

Once the phosphatic material, such as Montana or Tennessee rock, or Florida pebble phosphate, has been sized to about —1 mm. more or less, and if desired, washed with water to remove slimes and dewatered in a classifier to separate water from the rock, the material is reagentized with the novel composition herein described.

It has been discovered that the material resulting from a strong acid treatment or acidulation of a residue remaining after a vegetable oil distillation contains certain beneficial values which are the subject matter of this invention. It is not known exactly what the specific chemical composition of these values are. However, it has been discovered that the acid treated residue does accomplish the desired results for the benefication of phosphatic materials when used in conjunction with other substances conventionally employed in such reagentizing operations. The residues without the acid treatment are not effective reagentizing materials.

The term "vegetable oil residue" is used herein and in the appended claims to distinguish from vegetable oils which have been purified by various physical and/or chemical means which are familiar to persons skilled in the vegetable oil art. Specifically, the term "vegetable oil residue" means the residue remaining when a crude vegetable oil is subjected to distillation. In the distillation, a vegetable oil is distilled overhead and the "vegetable oil residue" remains. The material remaining after about 50% by volume of the crude vegetable oil charge is distilled over, is a "vegetable oil residue" within the meaning of this invention. It is preferred, however, that at least 70% by volume and, still more preferably, at least 75% by volume of the crude vegetable oil be distilled out to leave as a residue the preferred vegetable oil residue to be treated in accordance with this invention.

The distillation may be a pressure, atmospheric, vacuum, or steam distillation. The residue may be known in the art as residue, pitch, bottoms or by other names. Examples of suitable vegetable oil residues are tall oil pitch, soya oil pitch, fatty acid pitch, and cotton seed pitch. These examples are considered to be merely exemplary, and not all-inclusive of the types of "residues" which are applicable for the production of the acid treated residue, which is an essential ingredient of the reagentizing composition.

In addition to the essential values of the acid treated vegetable oil residue, the reagentizing composition also contains a basic material such as caustic soda, soda ash, KOH, or the like, in order to regulate the pH of the suspension or pulped slurry above 7.0 and preferably between about 8.0 and about 9.0. Still a third component of the reagentizing composition is a liquid hydrocarbon component which is a liquid under the conditions obtaining. Suitable substances in this category are diesel oil, fuel oil, kerosene, the heavier solvent naphthas, crude oil, and the like, as well as mixtures of two or more of these liquid hydrocarbon components.

Each of the three above specified components of the reagentizing composition may be added separately or they may be added as a previously prepared admixture to the dewatered phosphatic material.

The required acid treated vegetable oil residue may be prepared by the acid treatment or acidulation of one or more vegetable oil residues. The acid treatment may be performed in any suitable manner. One method is to mix the vegetable oil residue with a strong mineral acid and to agitate the mixture. A preferred method is to first mix the vegetable oil residue with a liquid hydrocarbon component and to then contact the mixture with a strong mineral acid. It appears that the acid treatment of the vegetable oil rssidue is an acid hydrolysis and, therefore, the resultant composition may be termed an acid hydrolyzed vegetable oil residue.

Sulfuric acid is a preferred acid to use for treating the vegetable oil residue since it is a relatively strong and inexpensive acid and it appears that the sulfate radicals render the reagentizing composition more efficient. Other suitable strong mineral acids which will effect hydrolysis of a vegetable oil residue may also be used, for example, hydrochloric acid, phosphoric acid, etc. The treatment is preferably with a concentrated acid; however, a diluted acid may be used. When a dilute acid is used, it is preferred that the mixture of acid and vegetable oil residue be heated during the treatment.

The mixture of acid and vegetable oil residue, which may also have a liquid hydrocarbon component therein is preferably agitated to insure uniform treatment or acidulation of the residue. The time of treatment, the temperature and other variables depend to an extent upon the concentration of the acid used, as in indicated above. The acid hydrolysis of the residue appears to occur very rapidly when a concentrated acid is used. In general, the usual conditions for an acid hydrolysis of a heavy oil have been found to be suitable. In the acid treatment of the vegetable oil residue, it is preferable to use an amount of acid which will effect a substantial amount of hydrolysis of the vegetable oil residue, and it is still more preferable to use an excess of acid in order to achieve as much hydrolysis as possible under the treating conditions.

As hereinabove set forth, the acid treated vegetable oil residue, the liquid hydrocarbon component, and the basic material may be added separately or they may be added as a previously prepared admixture to the dewatered phosphatic material. Also, it is possible to obtain substantial results in beneficiating the phosphatic rock ore, if the hydrocarbon component of the reagentizing composition is omitted entirely.

A typical composition may be prepared in the following manner, the amounts being in pounds per ton of dewatered ore treated:

A. Acid treated vegetable oil residue in an amount between about 0.5 and about 3.0.

B. Diesel or fuel oil in conventional amounts, usually between about 0.1 and about 6.0.

C. Caustic soda or any other suitable basis material in conventional amounts, usually between about 0.2 and about 1.5.

A phosphatic rock reagentized with a composition as above described may be subjected to a separation or segregation step, or sequence of such steps in a number of ways, all of which effect a marked beneficiation or concentration of the desired phosphatic values of ore. Such a reagentized feed may be treated by slurrying in water to form an aqueous suspension, aerating the suspension, and allowing the froth layer and agglomerate layer to collect at the top of the flotation cell while the siliceous and other impurities and less desired values sink to the bottom of the cell. In this manner the floated phosphatic values are segregated from the siliceous bodies and the like. The concentrate or partially concentrated phosphatic material may then be subjected to a further flotation or series of flotation steps employing the same reagentizing composition or a different one to further beneficiate the phosphatic values. One of the advantages in the use of the instant reagentizing composition is that it is easily broken up and defrothed after flotation has been completed. This is accomplished by treating the floated phosphatic values with sulfuric acid to remove the oil and other reagents adhering to the phosphatic values.

A further concentration and beneficiation of the phosphatic values segregated in the froth layer of the flotation cell may be treated as above stated in the conventional manner to effect the desired degree of concentration of the B.P.L. (bone phosphate of lime) content of the material.

The novel reagentizing composition may also be applied in processes designed to beneficiate or concentrate phosphatic ores and other ores previously mentioned in which flotation steps are not involved. Thus, for example, the reagentized phosphatic feed, either as an original or intermediate step in the beneficiation, may be subjected to a tabling operation of conventional design to allow the collection and segregation of phosphatic material on the one hand, and siliceous and heavy mineral bodies on the other hand. Also, it has been discovered that phosphatic material reagentized with the novel composition herein set forth may be successfully beneficiated as to its phosphatic content by contacting such reagentized feed in a downwardly spiralling path so as to permit the phosphatic material to be selectively centrifugally moved to the outer side of the spiral pathway, while the siliceous bodies and other impurities are collected from the inner portion of the spiral pathway.

As illustrative of the character of the instant invention, but in no wise intending to be limited thereby the following examples are given:

EXAMPLES

In the following examples, each run was carried out under the same set of standard conditions of treatment and involved the same amounts of ore or rock and the like, and except as indicated in the table, all conditions, reagents, and treatments remained constant so that a set of strictly comparable results were obtained with the exceptions noted in the table.

In each instance 1000 grams of Florida pebble rock of about —28 mesh was deslimed and dewatered to about 80% solids, placed in a mixing chamber with reagent, and agitated for about one minute. The treated mixture was then diluted with water, placed in a flotation cell and agitated for about two minutes with the various types of reagents in the amounts specified below.

In each case the flotation reagents were prepared by dissolving 100 grams of the pitch in 100 grams of kerosene and 200 grams of petroleum oil. Sodium hydroxide solution used for pH control was made by dissolving 5 grams of NaOH in water and diluting to 100 ml. This solution was used to supply NaOH in the amounts indicated in Table I.

The acidulated materials were prepared by mixing the flotation reagents (i.e., the mixture of pitch, kerosene and petroleum oil in the proportions indicated above) with 18% by weight of concentrated (95%) sulfuric acid and mixing for 30 minutes at 30° C.

Table I

| Example No. | 1 | 2 | 3 | 4 | 5 | 6 | 7 |
|---|---|---|---|---|---|---|---|
| Collector Used | Tall Oil Pitch | Acidulated Tall Oil Pitch | Acidulated Tall Oil Pitch | Soya Pitch | Acidulated Soya Pitch | Fatty Acid Pitch | Acidulated Fatty Acid Pitch |
| Flotation Reagent, lbs./ton | 1.5 | 1.0 | 1.5 | 1.5 | 1.5 | 2.0 | 1.5 |
| NaOH, lbs./ton | 0.5 | 0.5 | 0.5 | 0.5 | 0.5 | 0.5 | 0.5 |
| B.P.L. in Feed, Wt. Percent | 29.7 | 29.7 | 29.7 | 29.7 | 29.7 | 29.7 | 29.7 |
| Product: | | | | | | | |
| Recovered, Wt. Percent | (¹) | 33.8 | 39.9 | (¹) | 12.4 | (¹) | 39.6 |
| B.P.L., Wt. Percent | (¹) | 69.92 | 66.42 | (¹) | 71.9 | (¹) | 68.61 |
| B.P.L Recovered, Wt. Percent | (¹) | 80.3 | 89.4 | (¹) | 30.9 | (¹) | 91.1 |

¹ No Flotation.

Examples 1, 4 and 6 illustrate the use of a vegetable oil residue as a collector. In each case, no appreciable flotation was observed.

Examples 2 and 3 illustrate the use of acidulated tall oil pitch at different rates of reagent addition. It may be seen from the data that in each case the acidulated tall oil pitch recovered a large percentage of the B.P.L. and at a purity which makes the product commercially saleable.

Example 5 illustrates the use of acidulated soya pitch as a collector. At the rate of reagent addition used (1.5) only 30.9% of the B.P.L. was recovered; however, it should be observed that the product had a high purity.

Example 7 illustrates the use of a commercially available fatty acid pitch as a collector. A high percentage of the B.P.L. in the charge was recovered in the product (91.1%) and the product also had a high purity (68.61%)

These examples illustrate the utility of the acidulated vegetable oil residues in a flotation ore beneficiation process. In each case a high yield and high purity of product was obtained.

The description of the invention utilized specific reference to certain process details; however, it is to be understood that such details are illustrative only and not by way of limitation. Other modifications and equivalents of the invention will be apparent to those skilled in the art from the foregoing description.

Having now fully described and illustrated the invention, what is desired to be secured and claimed by Letters Patent is set forth in the appended claims.

1. A reagent for use in a process for beneficiating non-metallic ores which reagent comprises the product resulting from the acid treatment with a mineral acid, under conditions effective to substantially hydrolyze, of a vegetable oil pitch obtained after distilling over of at least 50% by volume of a crude vegetable oil.

2. A reagent for use in a process for beneficiating non-metallic ores which comprises the product resulting from the treatment with sulfuric acid, under conditions effective to substantially hydrolyze, of a tall oil pitch obtained after distilling over of at least 50% by volume of a crude tall oil.

3. A reagent for use in a process for beneficiating non-metallic ores which comprises the product resulting from the treatment with sulfuric acid, under conditions effective to substantially hydrolyze, of a soya oil pitch obtained after distilling over of at least 50% by volume of a crude soya oil.

4. A reagent for use in a process for beneficiating non-metallic ores which reagent comprises the product resulting from the acid treatment with a mineral acid, under conditions effective to substantially hydrolyze, of a vegetable oil pitch obtained after distilling over of at least 70% by volume of a crude vegetable oil.

5. An ore flotation process which comprises agitating and aerating an aqueous suspension of a non-metallic ore in a finely divided state in admixture with the product resulting from the acid treatment with a mineral acid, under conditions effective to substantially hydrolyze, of a vegetable oil pitch obtained after the distillation over of at least 50% by volume of a crude vegetable oil.

6. An ore flotation process which comprises agitating and aerating an aqueous suspension of a non-metallic ore in a finely divided state in admixture with the product resulting from the treatment with sulfuric acid, under conditions effective to substantially hydrolyze, of a tall oil pitch obtained after distilling over of at least 50% by volume of a crude tall oil.

7. An ore flotation process which comprises agitating and aerating an aqueous suspension of a non-metallic ore in a finely divided state in admixture with the product resulting from the treatment with sulfuric acid, under conditions effective to substantially hydrolyze, of a soya oil pitch obtained after distilling over of at least 50% by volume of a crude soya oil.

8. An ore flotation process which comprises agitating and aerating an aqueous suspension of a non-metallic ore in a finely divided state in admixture with the product resulting from the acid treatment with a mineral acid, under conditions effective to substantially hydrolyze, of a vegetable oil pitch obtained by the distillation over of at least 70% by volume of a crude vegetable oil.

9. A process for concentrating a phosphatic ore which comprises agitating and aerating an aqueous suspension of a phosphatic ore in a finely divided state in admixture with the product resulting from the acid treatment with a mineral acid, under conditions effective to substantially hydrolyze, of a vegetable oil pitch obtained after the distillation over of at least 50% by volume of a crude vegetable oil.

10. A process for concentrating a phosphatic ore which comprises agitating and aerating an aqueous suspension of a phosphatic ore in a finely divided state in admixture with the product resulting from the acid treatment with a mineral acid, under conditions effective to substantially hydrolyze, of a vegetable oil pitch obtained after the distillation over of at least 70% by volume of a crude vegetable oil.

References Cited in the file of this patent

UNITED STATES PATENTS

| 1,912,433 | Crago et al. | June 6, 1933 |
| 1,968,876 | Crago et al. | Aug. 7, 1934 |
| 2,216,992 | Vogel-Jorgensen | Oct. 8, 1940 |
| 2,857,331 | Hollingsworth | Oct. 21, 1958 |

OTHER REFERENCES

Soap Manufacture, volume I, Davidson et al., Interscience, New York, 1953, pages 245–247.